Jan. 7, 1958  M. H. BENN  2,818,939
EMERGENCY BRAKING DEVICE FOR VEHICLES
Filed May 13, 1955  2 Sheets-Sheet 1
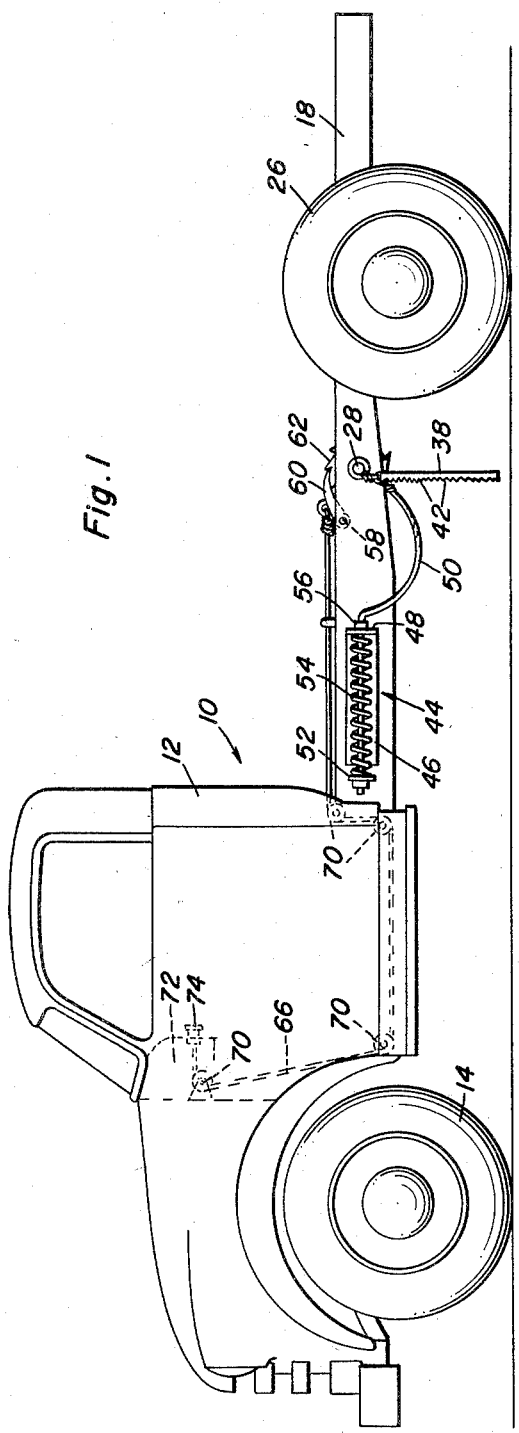
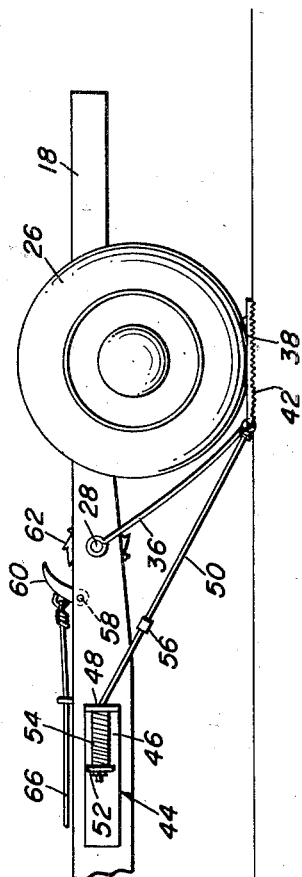
Marshall H. Benn
INVENTOR.

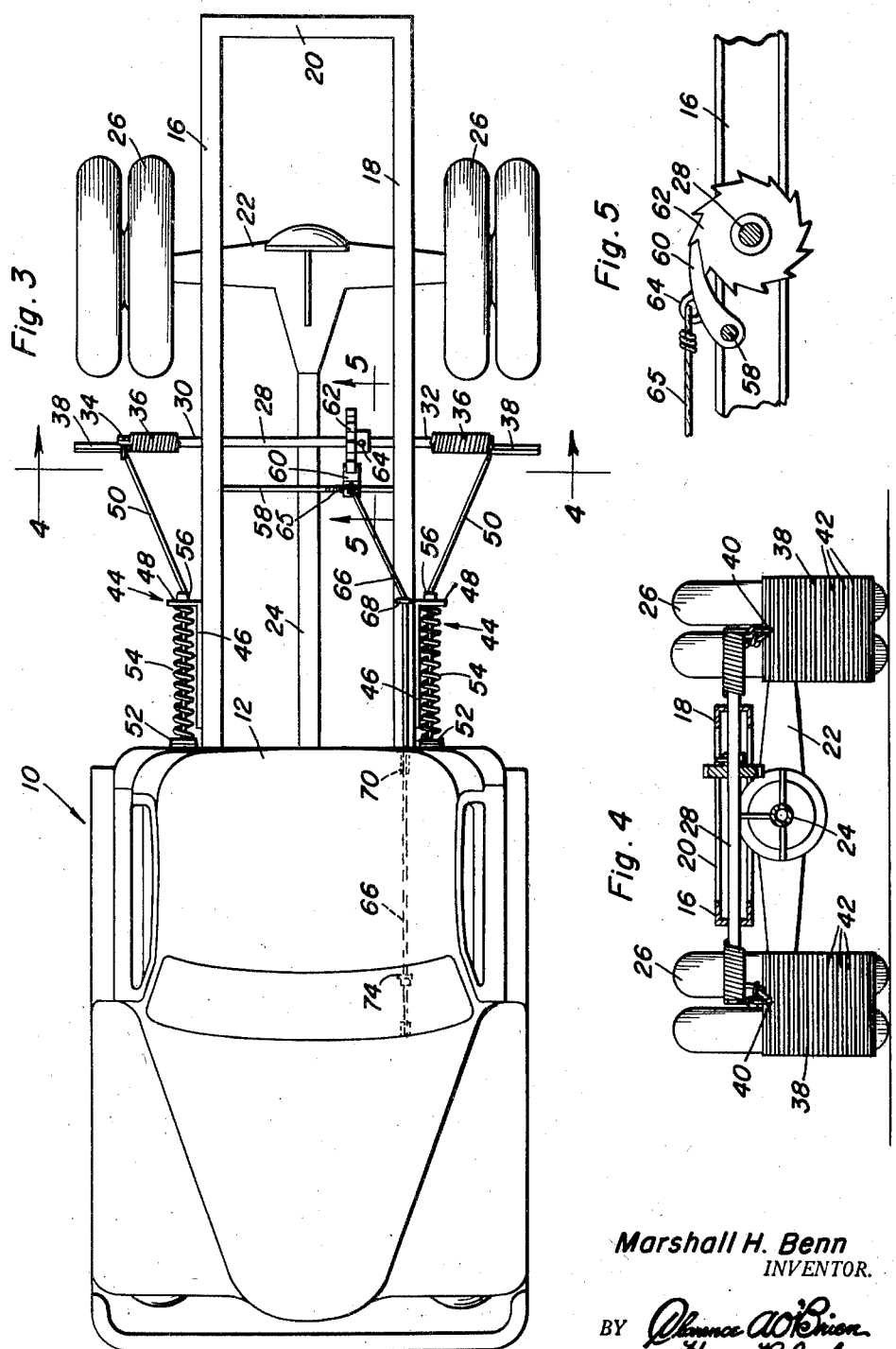

United States Patent Office 2,818,939
Patented Jan. 7, 1958

2,818,939

EMERGENCY BRAKING DEVICE FOR VEHICLES

Marshall H. Benn, Brentwood, Calif.

Application May 13, 1955, Serial No. 508,055

1 Claim. (Cl. 188—4)

This invention relates generally to braking systems for vehicles, and is more particularly related to an emergency braking device useable on a vehicle when all other braking facilities are unavailable.

The principal object of invention is to provide a readily installable emergency braking device cooperating between the road surface and vehicle wheel to check the rotation of the wheel for bringing the vehicle to a stop in a relatively short distance with a minimum amount of danger and skidding of the vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of a truck showing the emergency braking device and the truck frame;

Figure 2 is a fragmentary side elevational view of the truck of Figure 1 showing the position of the emergency braking device after actuation;

Figure 3 is a top plan view of the truck of Figure 1;

Figure 4 is a sectional view taken substantially on line 4—4 of Figure 3; and

Figure 5 is an enlarged sectional view taken substantially on line 5—5 of Figure 3.

Indicated at 10 is a truck which includes the usual cab 12, front wheel assembly 14, side frame members 16 and 18 connected by a transverse frame member 20, side frame members suitably supporting the rear wheel assembly 22 which is connected to a conventional drive shaft indicated at 24. The rear wheel assembly includes the dual wheels 26 which will be braked by the emergency braking device to be subsequently described.

Extending between the side frame members 16 and 18 forward of the dual wheels 26 is a suitably journalled rotatable shaft 28 which has end portions 30 and 32 extending beyond the side frame members, the end 30 having a square end portion 34 for accommodating a suitable handle (not shown). Coiled on ends 30 and 32 of the shaft 28 and having one end fixedly secured thereto is a flexible cable 36 of steel, for example, said cable having secured at its other end a braking plate 38 being secured thereto by means of a suitable aperture 40 in the upper end of said plate. The plate 38 includes on its forwardly directed surface in the position shown in Figure 1, a plurality of horizontal serrations 42 which increase the friction and aid in stopping the vehicle more rapidly when the braking plate 38 is in the position seen in Figure 2 when the plate is located beneath the wheels 26.

A pair of L-shaped brackets 44 which include an elongated side 46 are secured on the outer sides of the side frame members 16 and 18 and include outwardly extending flanges 48. A second wire cable 50 has one end secured through the aperture 40 in the braking plate 38, and has the other end extending through a suitable aperture in the flanges 48 of the brackets 44 including an enlarged end member 52 secured on the other end of said cable 50, a compression spring 54 being concentrically disposed on said cable 50 between the end 52 and the outwardly extending flange 48. Suitable stop members 56 are provided on the cable 50 for limiting the extent the cable 50 will be urged through the flange 48 by virtue of the compression spring 54.

As seen in Figures 1 and 3, the braking plate 38 is normally retained in a substantially vertical position most clearly seen in Figure 1, with the cable 36 being coiled as shown in Figure 3, the cable 50 is provided with sufficient slack as seen in Figure 1, and when the braking plate 38 is permitted to move under the wheels 26, as seen in Figure 2, the cable 36 is uncoiled from the shaft 32, the cable 50 is pulled through the flange 48 of the bracket 44 the spring 54 taking up sudden shock resulting from emergency braking utilizing the braking plate 38.

A shaft 58 extends between the side frame members 16 and 18 forwardly of the shaft 28 and being secured therebetween in any suitable manner, and has rotatably journalled thereon a latch element 60 which cooperates with a ratchet wheel 62 fixedly secured to the shaft 28 by means of a suitable setscrew 64. A suitable spring 65, see Figure 3, is provided on the shaft 58 having one end secured thereon, and the other end secured to the latch member 60 in order that the latch member 60 is urged into contact with the ratchet wheel 62. Thus the ratchet wheel 62 through the latch 60 normally retains the braking plate 38 in a raised position above the ground shown in Figure 1, and upon release of the latch 60 from the ratchet wheel 62, as will be seen, the weight of the braking plate 38 will uncoil the cable 36 and the plate will gravitate to the ground and will assume the position beneath the wheels 26 as previously described.

The latch 60 includes a suitable eye portion 65 through which is suitably secured an actuating cable 66 extending through suitable guides 68 on the frame and being journalled over suitable friction reducing pulleys 70, said cable 66 being suitably extended through the dashboard 72 in the cab of the vehicle, and having an actuating handle 74 available in said cab.

Various positional directional terms such as "front", "rear," "side" are utilized herein to have only a relative connotation to aid in describing the device and are not intended to be interpreted as requiring any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A vehicle brake comprising a rotary shaft attachable to side frame members of a vehicle transversely thereof in front of each vehicle rear wheel, a pair of brake plates, a coiled cable for each plate on each end of said shaft suspending said plates and responsive to gravity pull of said plates to uncoil and rotate said shaft to lower the plates to the ground in front of said wheels for sliding rearwardly by said wheels under the same, means for limiting rearward sliding of said plates comprising for each plate a bracket attachable rigidly horizonatlly to one side member forwardly of said shaft, a second cable attached at one end to one of said plates for pull thereon by sliding of said plate, said second cable being slidable in said bracket rearwardly by rearward sliding of said plate and having its other end provided with an enlarged terminal member on one side of the bracket, a coil spring on said other end of said second cable interposed between said bracket and enlarged member and normally sliding said second cable forwardly, a stop on said second cable on the other side of said bracket engaging said bracket to limit forward sliding of said second cable, and means attachable to said members for releasably restraining the shaft rotation in one direction.

References Cited in the file of this patent

UNITED STATES PATENTS

| | | |
|---|---|---|
| 1,201,684 | Brockhaus | Oct. 17, 1916 |
| 2,224,785 | Greene | Dec. 10, 1940 |
| 2,562,521 | Blattner | July 31, 1951 |
| 2,718,283 | Ropp | Sept. 20, 1955 |